Patented June 4, 1940

2,202,933

UNITED STATES PATENT OFFICE 2,202,933

SULPHANILAMIDO-AMINOPYRIDINES AND PROCESS FOR PRODUCING THE SAME

Edmond T. Tisza, Bernard F. Duesel, and Harris L. Friedman, Yonkers, N. Y., assignors to Nepera Chemical Co., Inc., Nepera Park, N. Y., a corporation of New York No Drawing. Application August 30, 1939, Serial No. 292,630

4 Claims. (Cl. 260—296)

Our invention relates to new substitution products of pyridine and refers particularly to pyridine compounds having valuable therapeutic properties and this application is a continuation-in-part of the patent application for Sulphanilamido-amino-pyridines and process for producing the same, filed in the United States Patent Office on November 29, 1938, under Serial Number 242,892.

It is known that azo dyes prepared from diaminopyridines are very important as urinary antiseptics, and further, sulphanilamide is also known as an important therapeutic agent. We have found that diaminopyridines may be condensed with p-amino-benzene-sulphonamide to form new substances, which are valuable as therapeutic agents, and that they form starting materials for the production of other valuable compounds as, for instance, they may be coupled with diazotised and tetrazotised amines of the aromatic series.

The general formula of these compounds is:

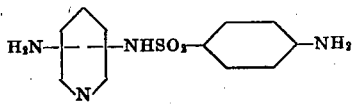

The compounds are prepared by reacting p-acetamino-benzenesulphonylchloride with diamino-pyridines. One of the amino groups of the diaminopyridines is acetylated for protection, and by doing that the position of the condensation can be selected. In our application Serial Number 242,892 we have shown that condensation takes place, when the two substances are fused together in a suitable vessel, and heated to the desired temperature. The condensation may be made also in a non-reacting solvent, like, for instance, benzene or chloroform. The solvent may dissolve one or both substances. After the condensation, the acetyl groups are hydrolyzed off the usual manner.

The chemical reaction of the process is the following:

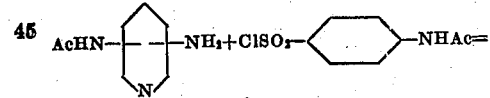

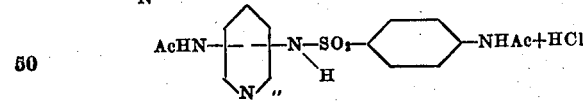

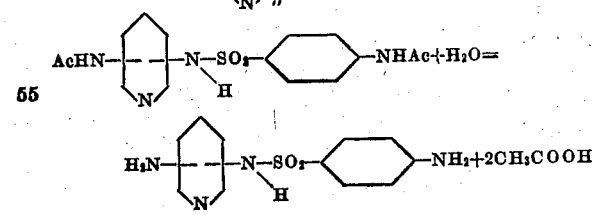

The hydrolyzation takes place in acid or alkaline solution, though experience shows that the alkaline solution is preferable.

Pyridine appears to be an exceedingly good solvent for the condensation as the hydrochloric acid formed in the first step is taken up by the solvent and the yield is considerably increased.

EXAMPLE 1

20 grams pure 2-amino, 5-acetaminopyridine were dissolved in 100 cc. dry pyridine and 32 grams p-acetamino-benzene-sulphonylchloride purified by recrystallization out of benzene were added. The mixture heated up considerably and took on a deep red color. On refluxing for 45 minutes the color turned to light brown and a precipitate was formed. The precipitate, about 30 grams, was collected and washed with water. 50 grams of ice were added to the filtrate and neutralized with concentrated hydrochloric acid. A further amount, about 20 grams of precipitate, came out which was also collected and washed with water. The combined precipitates were dissolved in 200 cc. 1% sodium hydroxide and boiled up with charcoal. 20 grams sodium hydroxide were added to the filtered solution and refluxed for one hour to complete the hydrolysis. The solution was now neutralized to pH 7.0 and cooled on ice. The collected and washed precipitate was now recrystallized out of water with charcoal, and further purified by recrystallization out of water.

The product so obtained,

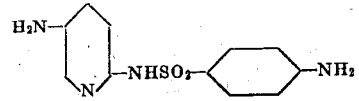

2-sulphanilamido, 5-aminopyridine forms pale pink colored needles. M. P. 157–9° C. It is slightly soluble in cold, more in hot water, alcohol, acetone, dilute alkalies and dilute acids, slightly soluble in ethyl acetate. It is insoluble in chloroform, ether, benzene and ligroine. The foregoing formula was confirmed by analysis. In a nitrogen determination (micro-Dumas) there was found N=20.93%. Theoretical N=21.20%.

EXAMPLE 2

1 gram 2-amino, 5-acetamino pyridine was condensed with 1.6 g. p-acetaminobenzene-sulphonylchloride as in Example 1 and the acetyl derivative collected. The collected precipitate was suspended in 15 ccs. hydrochloric acid of 10% and boiled gently for 20 minutes. All went into solution. After cooling, the solution was neutralized with sodium bicarbonate, and the precipitate purified by recrystallization from water. M. P. 158–159° C.

2-sulphanilamido, 5-aminopyridine is a relatively nontoxic substance as experiments on mice prove. The table below shows that 3 grams per kilogram are well tolerated.

Table I

Oral acute toxicity of 2-sulphanilamido, 5-aminopyridine.

| Number of mice | Dose in gm./kgm. | Number dead, time in days | | | Percent dead |
|---|---|---|---|---|---|
| | | 1 | 2 | 3 | |
| 5 | 2 | 0 | 0 | 0 | 0 |
| 5 | 3 | 0 | 0 | 0 | 0 |
| 5 | 4 | 3 | 0 | 0 | 60 |
| Convulsions were produced at 4 grams per kilogram | | | | | |

This new compound appears to be superior to sulphanilamide not only because of its low toxicity but also by its therapeutic action. A comparative study has shown that the survival of mice infected with streptococci and treated with our substances is far greater than those treated with sulphanilamide, as can be seen from the following tables:

Table II

Streptococci (Strain 1896) were used in this experiment for infecting the mice intraperitoneally and they were treated with 12 mg. of 2-sulphanilamido, 5-aminopyridine immediately after infection, plus once daily for three consecutive days.

| Number of mice | Compound used | Dose per mouse in mgm. | Percent survival, time in days | | | | |
|---|---|---|---|---|---|---|---|
| | | | 1 | 2 | 3 | 4 | 5 |
| 10 | Sulphanilamide | 12 | 100 | 80 | 20 | 20 | 20 |
| 10 | 2-sulphanilamido, 5-aminopyridine | 12 | 100 | 100 | 100 | 100 | 70 |
| 10 | Control | | 0 | | | | |

Table III

Streptococci (Strain C203) were used in this experiment for infecting the mice.

| Number of mice | Compound used | Dose per mouse in mgm. | Percent survival, time in days | | | | |
|---|---|---|---|---|---|---|---|
| | | | 1 | 2 | 3 | 4 | 5 |
| 50 | Sulphanilamide | 10 | 100 | 75 | 55 | 15 | 0 |
| 50 | 2-sulphanilamido, 5-aminopyridine | 10 | 100 | 92 | 76 | 44 | 30 |
| 25 | Control | | 0 | | | | |

These experiments establish the value of our compound for therapeutic purposes.

We have shown in our co-pending application, Serial Number 242,892, that azo dyes may be formed from our compound by coupling with diazotised arylamines.

It is obvious that azo dyes and other compounds may be prepared from the compound described in the foregoing specification without departing from the invention or sacrificing the advantages thereof; therefore, we do not intend to limit ourselves to the specific embodiment herein set forth except as indicated in the appended claims.

What we claim is:

1. The method of producing 2-sulphanilamido, 5-aminopyridine comprising reacting p-acetamino-benzene-sulphonyl chloride with 2-amino, 5-acetamino-pyridine, hydrolyzing off the acetyl groups by heating the reaction product in an acid or alkaline solution, neutralizing the thus produced solution, removing the precipitate thus formed and purifying the thus formed precipitate.

2. The method of producing 2-sulphanilamido, 5-aminopyridine comprising reacting p-acetamino-benzene-sulphonyl chloride with 2-amino, 5-acetamino-pyridine, hydrolyzing off the acetyl groups by heating the reaction product in an alkaline solution, neutralizing the thus produced solution, removing the precipitate thus formed and purifying the thus formed precipitate.

3. The method of producing 2-sulphanilamido, 5-aminopyridine comprising reacting p-acetamino-benzene-sulphonyl chloride with 2-amino, 5-acetamino-pyridine, hydrolyzing off the acetyl groups by heating the reaction product in an acid solution, neutralizing the thus produced solution, removing the precipitate thus formed and purifying the thus formed precipitate.

4. As a new chemical compound 2-sulphanilamido, 5-aminopyridine of the following formula:

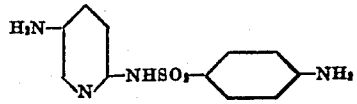

and N-acyl derivatives thereof.

EDMOND T. TISZA.
BERNARD F. DUESEL.
HARRIS L. FRIEDMAN.